June 13, 1950 W. B. GRUBER 2,511,334
STEREOSCOPIC VIEWER
Filed April 28, 1947 3 Sheets-Sheet 1

INVENTOR
WILHELM B. GRUBER
BY
ATTORNEY

June 13, 1950   W. B. GRUBER   2,511,334
STEREOSCOPIC VIEWER
Filed April 28, 1947   3 Sheets-Sheet 2
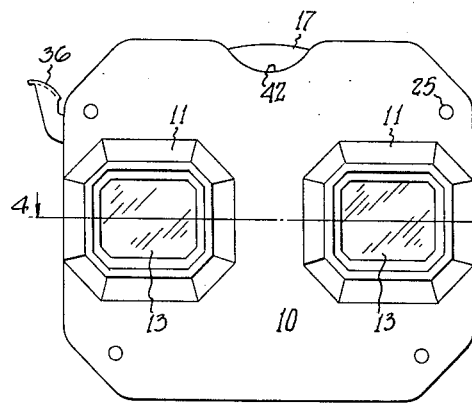
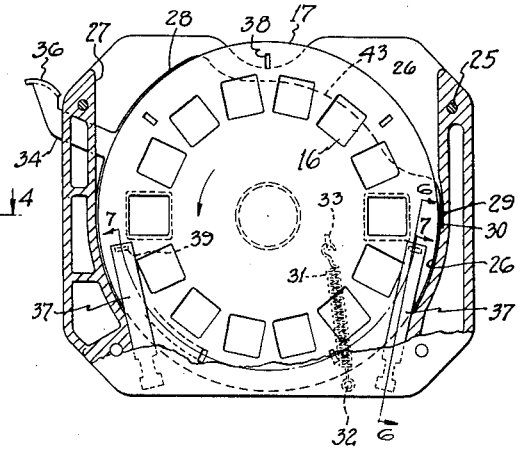
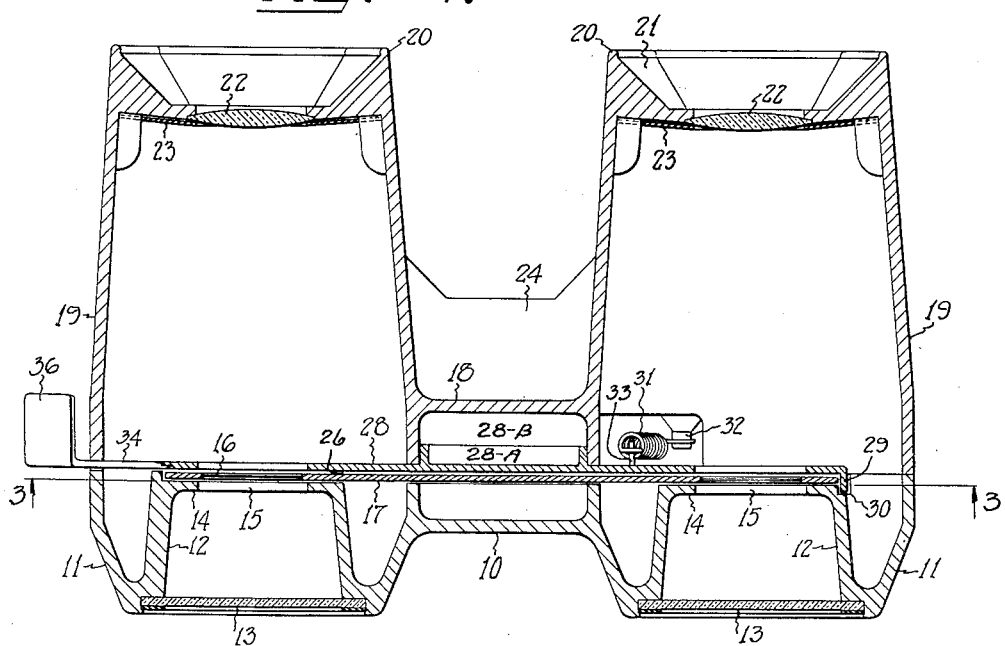
INVENTOR
WILHELM B. GRUBER
BY
ATTORNEY June 13, 1950   W. B. GRUBER   2,511,334
STEREOSCOPIC VIEWER
Filed April 28, 1947   3 Sheets-Sheet 3
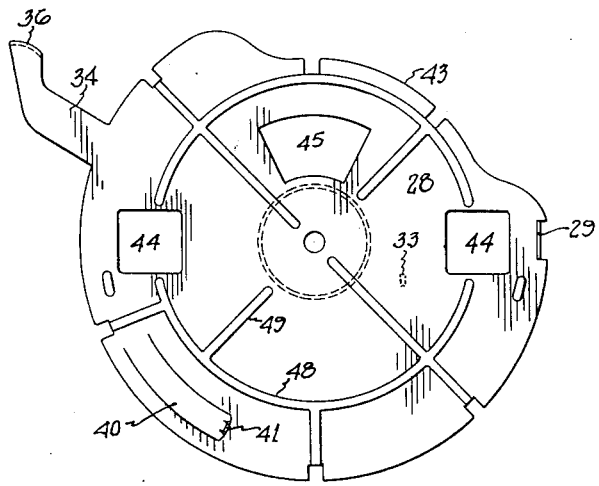
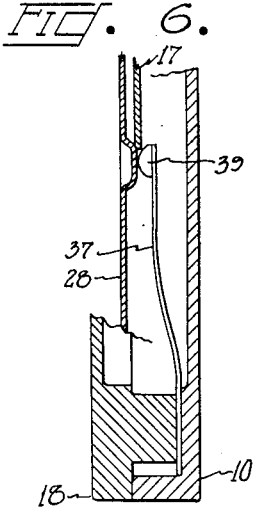
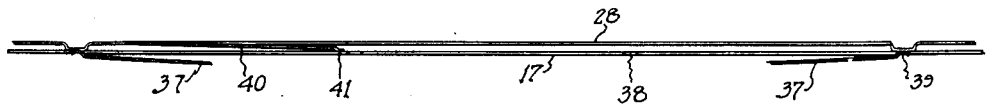
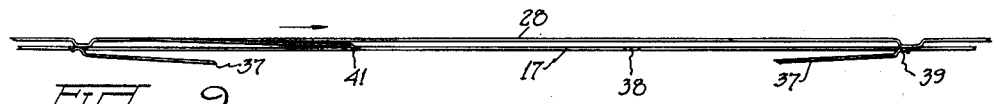
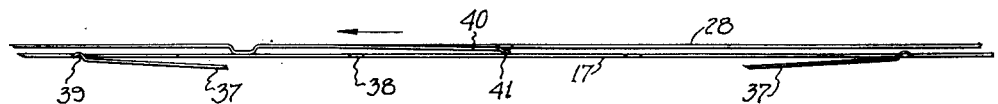
INVENTOR
WILHELM B. GRUBER
ATTORNEY Patented June 13, 1950

2,511,334

UNITED STATES PATENT OFFICE 2,511,334

STEREOSCOPIC VIEWER

Wilhelm B. Gruber, Portland, Oreg.

Application April 28, 1947, Serial No. 744,349

4 Claims. (Cl. 88—31)

This invention relates generally to stereoscopes and particularly to a stereoscopic instrument.

The main object of this invention is to devise a stereoscopic device especially adapted for viewing stereoscopic pictures arranged in circular or disc form, whereby the disc can be inserted and removed with a minimum amount of effort, skill or care on the part of the user.

The second object is to construct the device in a manner that it may be easy to manufacture and not easily rendered inoperative.

The third object is to so construct the device as to permit the principles employed therein to be incorporated in projecting as well as in viewing devices.

The fourth object is to so construct the device that during the transition of the disc from one set of views to another, the intervening views are covered, thereby relieving the eye of any unnecessary strain from the flashing of inverted views.

We accomplish these and other objects in a manner set forth in the following specification as illustrated in the accompanying drawings, in which Fig. 1 is a perspective view of a viewing device showing the manner of inserting the discs.

Fig. 2 is a direct front elevation of the device.

Fig. 3 is a section taken along the line 3—3 in Fig. 4.

Fig. 4 is a section taken along the line 4—4 in Fig. 2.

Fig. 5 is a side elevation of a runner.

Fig. 6 is a section taken along the line 6—6 in Fig. 3.

Fig. 7 is an expanded view taken along the line 7—7 in Fig. 3.

Fig. 8 is a view similar to Fig. 7 showing the parts in position at the start of an indexing movement.

Fig. 9 is a view similar to Fig. 8 but showing the position and movement of the parts nearing the end of the indexing movement.

Fig. 10 is a view similar to Fig. 9 showing the position and movement of the parts after the completion of an indexing movement.

Similar numbers refer to similar parts throughout the several views.

Figure 1:
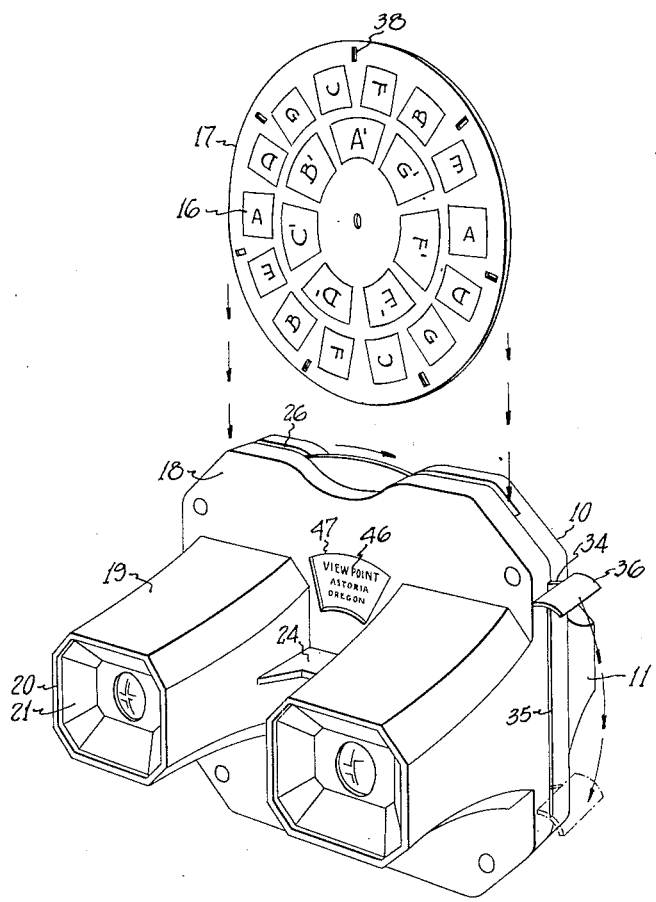

Referring in detail to the drawing, there is shown a back 10, having the octagonal projections 11 formed thereon. The projections 11 have the recesses 12 formed therein, in front of each of which is disposed a diffusion glass 13, while the opposite end 14 thereof is provided with an aperture 15, slightly larger and of the same shape as are the film frames 16 which are mounted on the disc 17. The film frames 16 are lettered from A to G in alternating succession, the purpose of which and the reasons therefor are more fully set forth in the United States patent of Wilhelm B. Gruber, No. 2,189,285, over which the device described herein is an improvement.

Mounted in front of the back 10 is a front plate 18 having the somewhat tapering octagonal tubes 19 projecting rearwardly therefrom and spaced to suit the average human eyes. The foremost end 20 of each tube 19 has a counter-sunk recess 21 which extends to the lens 22, which is held in place by the retainer 23. It is desirable to provide a strengthening rib 24 between the tubes 19. The members 10 and 18 are joined by means of the screws 25. Between the members 10 and 18 is formed a pocket or recess 26, the lower portion of which is in the form of a semicircle, while its sides 27 are substantially parallel and vertical at the same time, tangent with the pocket 26. This recess lies within the confines of the back 10 and its purpose is to receive the disc 17.

The front plate 18 is recessed to receive a runner 28, which is also in the form of a disc. The runner 28 is provided with a flange 29 which extends around the side of the disc 17 into the circular groove 30 formed therefor in the back 10.

The lug 29 serves as a gate which prevents removal of the disc 17 from the runner 28 or its withdrawal from the pocket 26 when the button 36 is rotated away from the position shown in Fig. 3.

The center of the runner 28 has formed around same a flange 28-A which journals in the opening 28-B formed between the members 19.

A spring 31 is anchored on the post 32 and attached to the pin 33 on the runner 28 tending to urge it in one direction.

The runner 28 has formed thereon a radial arm 34 which extends outwardly through the slot 35 and has formed on the outer end thereof a rounded button 36 for finger operation.

Imbedded in the member 10 are the flat springs 37, having means for engaging the radial slots 38 formed in the disc 17.

It will be noted in Fig. 6 that the pawl 39 on the spring 37 permits the disc 17 to be rotated in one direction while preventing its movement in the opposite direction, that is, the springs 37 hold the disk 17 in position after it has been moved by the runner 28.

The runner 28 has also formed thereon a spring 40 whose pawl 41 also engages the radial slots 38 in the disc 17, as shown in Fig. 3, and permits the runner 28 to drive the disc 17 in one direction when the button 36 is depressed.

It will be noted, however, that when the button 36 is depressed, the flange 29 is in an uppermost position, that is, when the button 36 is depressed to the position shown in dotted lines in Fig. 1, or through approximately 90 degrees, then the flange 29 is directly underneath the cut-out portion 42 in the back 10, which exposes a part of the disc 17 for insertion or withdrawal.

It can be seen from the foregoing that there is provided a viewing device which can be operated by a child without inconvenience or danger to the views or without unnecessary wear thereon. Moreover, the disc can be inserted only when the button 36 is in a raised position. It is desirable to cut the runner 28 away along the line 43 in order to expose the disc 17 above the cut-out portion 42 when the button is raised. Obviously, changes may be made in the details of construction without departing from the spirit of this invention.

For a fuller understanding of this invention, it will be borne in mind that the views are mounted in alternating inverted succession. It will be noted, for example, in Fig. 1 that the view or transparency 16 which is marked A, is between two other transparencies E and D, which are inverted.

The purpose of this, as fully explained in the Gruber Patent No. 2,189,285, is to make it possible to operate the discs continuously and this is done by moving the disc through two squares instead of one so that as each view appears, it will be right side up.

Since the runner 28 is provided with two openings 44, and these register only with the openings 15 when the button 36 is raised, it follows that the inverted images will not be visible to the observer, since they will be covered by the runner 28.

In the runner 28 is provided a window 45, within which is visible the title 46 of the particular views and the title 46 will be readable through the opening 47 formed in the back plate 18.

It is desirable to provide stiffening ribs 48 and 49 across the surface of the runner 28.

It will, of course, be understood that while this device has been described as a viewer, the principles involved therein apply equally well to a projector.

While I have thus illustrated and described my invention, it is not my desire to be limited to the precise form shown herein, and I intend to cover such forms and modifications of the invention as fall fairly within the appended claims.

I claim:

1. A stereoscopic viewer consisting of a pair of parallel viewing tubes having a connecting back for holding same in spaced relationship, said back having a transverse pocket formed therein, one side of which is semi-circular and the opposite side of which opens through the top of the viewer for the insertion of picture discs, a runner rockably mounted in said pocket, said runner having a spring pawl mounted thereon adapted to engage a picture disc when inserted in said pocket and drive said disc in one direction, a spring urged pawl mounted on said back engageable with said viewing disc, adapted to prevent the movement of said disc in a direction opposite to which it can be driven by said runner, a flange on said runner obstructing the outlet opening of said pocket when said runner is away from a rest position and a spring attached to said back and runner for urging said runner toward a rest position.

2. A stereoscopic viewer of the class described having a pair of viewing tubes, a joining frame for holding said tubes in parallel relationship, said frame having a pocket formed therein opening outwardly through the top of the viewer, the bottom of the pocket being semi-circular for receiving a picture disc, a rockable runner having a central flange journaling in said joining frame and having an outwardly projecting operating arm, a spring between said runner and frame adapted to urge said runner in a direction to raise said operating arm, spring urged pawls held by said frame adapted to hold a picture disc against rotation in one direction, a spring urged pawl on said runner adapted to drive a picture disc in a direction opposite to the holding action of said previously mentioned pawls and a flange on said runner extending around the edge of said picture disc to form an obstruction for the outlet of said pocket when said operating arm is away from its rest position, said runner having opposite apertures formed therein registering with the sight openings in said viewing tubes when said arm is in a rest position.

3. An instrument of the class described, consisting of front and back members having registering viewing tubes disposed thereon in parallel relationship and having a picture disc receiving slot disposed between said front and back members, said slot also having a rockable runner mounted therein, said runner having an arm projecting therefrom extending through the side of said instrument for the manual operation thereof, a spring for urging said arm in an upward direction, the lower portion of said slot being semicircular and forming a channel for a picture disc, the upper portion of said slot opening outwardly through the top of said instrument for the insertion of picture discs, said runner having a lug formed thereon approximately opposite its operating arm, said lug extending past the edge of a picture disc whereby said lug will be on the top side of said disc when said operating lever is depressed in order to form an obstruction for said slot, and driving means between said runner and disc.

4. A stereoscopic viewer having in combination a pair of parallel viewing tubes including a connecting frame, said frame having a pocket formed therein, a runner rockably mounted in said pocket, a picture disc rotatably mounted with relation to said runner, a spring between said runner and frame for urging said runner in one direction, an arm on said runner for manually rocking it against said spring, a pawl on said runner for driving said picture disc when said runner is rocked manually, said runner having viewing openings which register with a pair of pictures in said picture disc when said runner is in a rest position, said pocket having an outlet opening through which a picture disc may be inserted or withdrawn when said runner is in a rest position and pawls mounted in said frame engaging said picture disc for limiting its rotation in one direction.

WILHELM B. GRUBER.

REFERENCES CITED

The following references are of record in the file of this patent:

UNITED STATES PATENTS

| Number | Name | Date |
|---|---|---|
| 580,522 | Gardam | Apr. 13, 1897 |
| 709,342 | Maxwell | Sept. 16, 1902 |
| 1,504,989 | Spitzer | Aug. 12, 1924 |
| 1,957,043 | Harlow | May 1, 1934 |
| 1,965,687 | Chase | July 10, 1934 |
| 2,189,285 | Gruber | Feb. 6, 1940 |

FOREIGN PATENTS

| Number | Country | Date |
|---|---|---|
| 344,876 | Great Britain | Mar. 9, 1931 |